United States Patent
Ouyang

(10) Patent No.: US 10,264,315 B2
(45) Date of Patent: Apr. 16, 2019

(54) STREAMING EVENTS MODELING FOR INFORMATION RANKING

(71) Applicant: BBY SOLUTIONS, INC., Richfield, MN (US)

(72) Inventor: Dong Ouyang, Edina, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 15/703,730

(22) Filed: Sep. 13, 2017

(65) Prior Publication Data

US 2019/0082220 A1    Mar. 14, 2019

(51) Int. Cl.
| | |
|---|---|
| H04N 5/445 | (2011.01) |
| H04N 21/442 | (2011.01) |
| G06Q 30/02 | (2012.01) |
| G06F 17/30 | (2006.01) |
| H04N 21/258 | (2011.01) |
| H04N 21/466 | (2011.01) |
| G06F 3/048 | (2013.01) |

(52) U.S. Cl.
CPC ... *H04N 21/44222* (2013.01); *G06F 17/3053* (2013.01); *G06F 17/30867* (2013.01); *G06Q 30/0201* (2013.01); *G06Q 30/0251* (2013.01); *H04N 21/25891* (2013.01); *H04N 21/4667* (2013.01); *G06F 3/048* (2013.01); *G06Q 30/0202* (2013.01)

(58) Field of Classification Search
CPC ......... H04N 21/44222; H04N 21/4667; H04N 21/25891
USPC .......................................................... 725/46
See application file for complete search history.

(56) References Cited

U.S. PATENT DOCUMENTS

| | | | | |
|---|---|---|---|---|
| 6,832,245 B1 * | 12/2004 | Isaacs | .................. | G06Q 10/107 709/206 |
| 6,921,336 B1 * | 7/2005 | Best | ........................ | A63F 13/10 463/32 |

(Continued)

OTHER PUBLICATIONS

"Sitecore® Engagement Value best practices", White Paper, © 2001-2016 Sitecore® Retrieved from the Internet: <URL: http://www.sitecore.net/-/media/www/files/resources/white-papers/engagement_value_wp_ltr.pdf?la=nl-nl>, (2016), 31 pgs.

*Primary Examiner* — Michael B. Pierorazio
(74) *Attorney, Agent, or Firm* — Schwegman Lundberg & Woessner, P.A.

(57) ABSTRACT

Techniques and system configurations for generating rankings and ranking models for information based on streaming event data are disclosed herein. In an example, electronic operations used for ranking and ordering information provided in commerce user interface based on streaming events include: processing streaming events representing user interaction in a commerce user interface; producing a ranking model from the events for a subsequent output within the commerce user interface; and generating the subsequent output of the information set via the commerce user interface, using the ranking model, where respective items of information are ordered among each other based on an engagement score, an exposure score, or a relevancy score. In a further example, the exposure score is used as a weight to the engagement score, relative to the relevancy score. With this technique, a balanced approach for presenting and organizing data relevancy may be offered in user interfaces.

25 Claims, 10 Drawing Sheets

(56) References Cited

U.S. PATENT DOCUMENTS

| | | | | |
|---|---|---|---|---|
| 7,712,125 | B2* | 5/2010 | Herigstad | H04N 7/163 725/141 |
| 8,166,026 | B1* | 4/2012 | Sadler | G06F 17/30867 707/722 |
| 8,531,050 | B2* | 9/2013 | Barney | A63H 30/04 290/1 R |
| 8,698,746 | B1* | 4/2014 | Merrick | G06F 3/038 178/19.05 |
| 8,740,708 | B2* | 6/2014 | Karacal | A63F 13/98 463/38 |
| 8,830,170 | B2* | 9/2014 | Kao | G06F 3/0325 345/156 |
| 8,943,134 | B2* | 1/2015 | Reis | G06Q 30/0201 709/204 |
| 9,727,644 | B1* | 8/2017 | Teng | G06Q 50/01 |
| 9,892,431 | B1* | 2/2018 | Agrawal | G06Q 30/0242 |
| 9,955,218 | B2* | 4/2018 | Panchaksharaiah | H04N 21/4542 |
| 2002/0162120 | A1* | 10/2002 | Mitchell | H04N 7/165 725/135 |
| 2003/0216177 | A1* | 11/2003 | Aonuma | A63F 13/10 463/32 |
| 2005/0210502 | A1* | 9/2005 | Flickinger | G06Q 30/02 725/34 |
| 2006/0041472 | A1* | 2/2006 | Lukose | G06Q 30/00 705/14.66 |
| 2007/0022437 | A1* | 1/2007 | Gerken | H04N 7/17318 725/41 |
| 2007/0052177 | A1* | 3/2007 | Ikeda | A63F 13/24 273/317 |
| 2007/0060391 | A1* | 3/2007 | Ikeda | A63F 13/06 463/46 |
| 2007/0124775 | A1* | 5/2007 | DaCosta | H04N 7/17318 725/62 |
| 2007/0271580 | A1* | 11/2007 | Tischer | H04H 60/07 725/35 |
| 2008/0082510 | A1* | 4/2008 | Wang | H04H 60/37 |
| 2008/0178241 | A1* | 7/2008 | Gilboy | H04N 7/17318 725/114 |
| 2008/0201206 | A1 | 8/2008 | Pokorney et al. | |
| 2008/0201208 | A1* | 8/2008 | Tie | G06Q 30/02 705/14.41 |
| 2009/0067847 | A1* | 3/2009 | Nakamura | G08C 23/04 398/128 |
| 2009/0163274 | A1* | 6/2009 | Kando | A63F 13/10 463/31 |
| 2009/0195392 | A1* | 8/2009 | Zalewski | G06F 3/012 340/573.1 |
| 2009/0249388 | A1* | 10/2009 | Seidel | H04N 21/4126 725/32 |
| 2010/0192173 | A1* | 7/2010 | Mizuki | A63F 13/12 725/25 |
| 2010/0199318 | A1* | 8/2010 | Chang | H04N 7/17318 725/97 |
| 2011/0190052 | A1* | 8/2011 | Takeda | A63F 13/02 463/31 |
| 2011/0247042 | A1* | 10/2011 | Mallinson | G06F 17/30026 725/86 |
| 2012/0046767 | A1* | 2/2012 | Shimohata | A63F 13/217 700/91 |
| 2012/0133582 | A1* | 5/2012 | Ohsawa | G06F 3/0308 345/157 |
| 2012/0192222 | A1* | 7/2012 | Kumar | G06Q 30/0251 725/32 |
| 2012/0192228 | A1* | 7/2012 | Zito | G06F 17/30035 725/34 |
| 2012/0309515 | A1* | 12/2012 | Chung | H04N 21/274 463/31 |
| 2013/0159298 | A1* | 6/2013 | Mason | G06F 17/30864 707/728 |
| 2013/0171897 | A1* | 7/2013 | Hsu Tang | B32B 5/20 442/76 |
| 2013/0238413 | A1* | 9/2013 | Carlson | G06Q 30/0224 705/14.25 |
| 2013/0335226 | A1* | 12/2013 | Shen | H04R 5/033 340/573.1 |
| 2014/0052513 | A1* | 2/2014 | Ryan | G06Q 30/0255 705/14.16 |
| 2014/0168071 | A1* | 6/2014 | Ahmed | H04N 5/23206 345/156 |
| 2014/0309511 | A1* | 10/2014 | Stal | G16H 50/50 600/365 |
| 2015/0121418 | A1* | 4/2015 | Jain | H04N 21/812 725/32 |
| 2015/0154631 | A1* | 6/2015 | Umeda | G06Q 30/0243 705/14.42 |
| 2015/0254709 | A1* | 9/2015 | Carlyle | G06Q 30/0255 705/14.45 |
| 2015/0269609 | A1* | 9/2015 | Mehanian | G06Q 30/0246 705/14.45 |
| 2016/0021425 | A1* | 1/2016 | Eriksson | H04H 60/46 725/10 |
| 2016/0323643 | A1* | 11/2016 | Panchaksharaiah | H04N 21/44016 |
| 2016/0335270 | A1* | 11/2016 | Garg | G06F 17/3053 |
| 2017/0039578 | A1* | 2/2017 | Woddi | G06Q 30/0201 |
| 2017/0374414 | A1* | 12/2017 | Knox | H04N 21/44218 |
| 2018/0109828 | A1* | 4/2018 | Knox | H04N 21/251 |
| 2018/0115802 | A1* | 4/2018 | Knox | H04N 21/44218 |
| 2018/0124458 | A1* | 5/2018 | Knox | H04N 21/44218 |
| 2018/0124459 | A1* | 5/2018 | Knox | H04N 21/42201 |

* cited by examiner

| | |
|---|---|
| Term Search: "large high efficiency washer" | 1 - ACME – 5 Cu. Ft. 14 Cycle Front Loading Washer – Red<br>2 - WasherCo – 4 Cu. Ft. 12 Cycle Front Loading Washer – Black<br>3 - ACME – 4.5 Cu. Ft. 14 Cycle Front Loading Washer – White | Stream Model 1 ⌇510 |
| Product Category: "High Efficiency Clothes Washers" | 1 - WasherCo – Stackable 2.5 Cu. Ft. Front Loading Washer – Black<br>2 - WasherCo – 4 Cu. Ft. 12 Cycle Front Loading Washer – Black<br>3 - ACME – 4.5 Cu. Ft. 14 Cycle Front Loading Washer – White<br>4 - ACME – 5 Cu. Ft. 14 Cycle Front Loading Washer – Red<br>5 - WasherCo – 3.5 Cu. Ft. 12 Cycle Top Loading Washer – Black<br>6 - ACME – Stackable 2.5 Cu. Ft. Front Loading Washer – Red | Stream Model 2 ⌇520 |
| Product Sub-Category: "High Efficiency Clothes Washers >> Front Loading Washers" | 1 - WasherCo – 4 Cu. Ft. 12 Cycle Front Loading Washer – Black<br>2 - ACME – 5 Cu. Ft. 14 Cycle Front Loading Washer – Red<br>3 - ACME – 4.5 Cu. Ft. 14 Cycle Front Loading Washer – White | Stream Model 3 ⌇530 |

STREAMING EVENTS MODELING FOR INFORMATION RANKING

TECHNICAL FIELD

Embodiments discussed herein generally relate to data processing techniques of streaming interaction activities within electronic computing and communication systems. Certain embodiments discussed herein relate to processing client interaction event data and adjusting data outputs for use in information systems and generated graphical user interface outputs.

BACKGROUND

A number of electronic systems are commonly used to coordinate the offer and sale of products or services, and the display of information for such products or services, in electronic commerce settings. Many types of electronic user interfaces are provided to consumers for accessing electronic commerce information via electronic platforms such as kiosks, smart devices, websites, or mobile apps. For instance, consumers commonly utilize user interfaces on such platforms to identify products and services, obtain information (e.g., location, cost, specifications) on specific products and services, and to make and manage electronic purchases of such products and services.

The shopping and information gathering activity performed in such user interfaces that leads to product and service purchases may involve multiple user activities and inputs within the user interface. Such activities and inputs may include user actions to select hyperlinked content, enter search queries, navigate among different product or service descriptions, and designate or enter purchase information for a selected product or service.

Existing approaches for improving commerce user interfaces often focus on improving the degree of accuracy of searches, listings, advertisements, and features within consumer-facing user interfaces. Further, many existing approaches attempt to generate and modify pre-populated rankings of accompanying search results or product and service listings, in an effort to increase consumer interest and purchase activity for products or services. However, these approaches often do not consider actual user activity, but instead are based on predicted (expected) consumer activity or predefined categories. As a result, commerce user interfaces may end up providing incomplete or irrelevant information, resulting in the use of additional computer resources to locate relevant information and to fulfill consumer purchasing activity.

BRIEF DESCRIPTION OF THE DRAWINGS

FIG. 5 illustrates an example output of result sets from streaming event modeling and processing techniques, according to an example described herein.

FIG. 6 illustrates user interface functionality to provide an output for streaming event modeling and processing, according to an example described herein.

DETAILED DESCRIPTION

Figure 1:
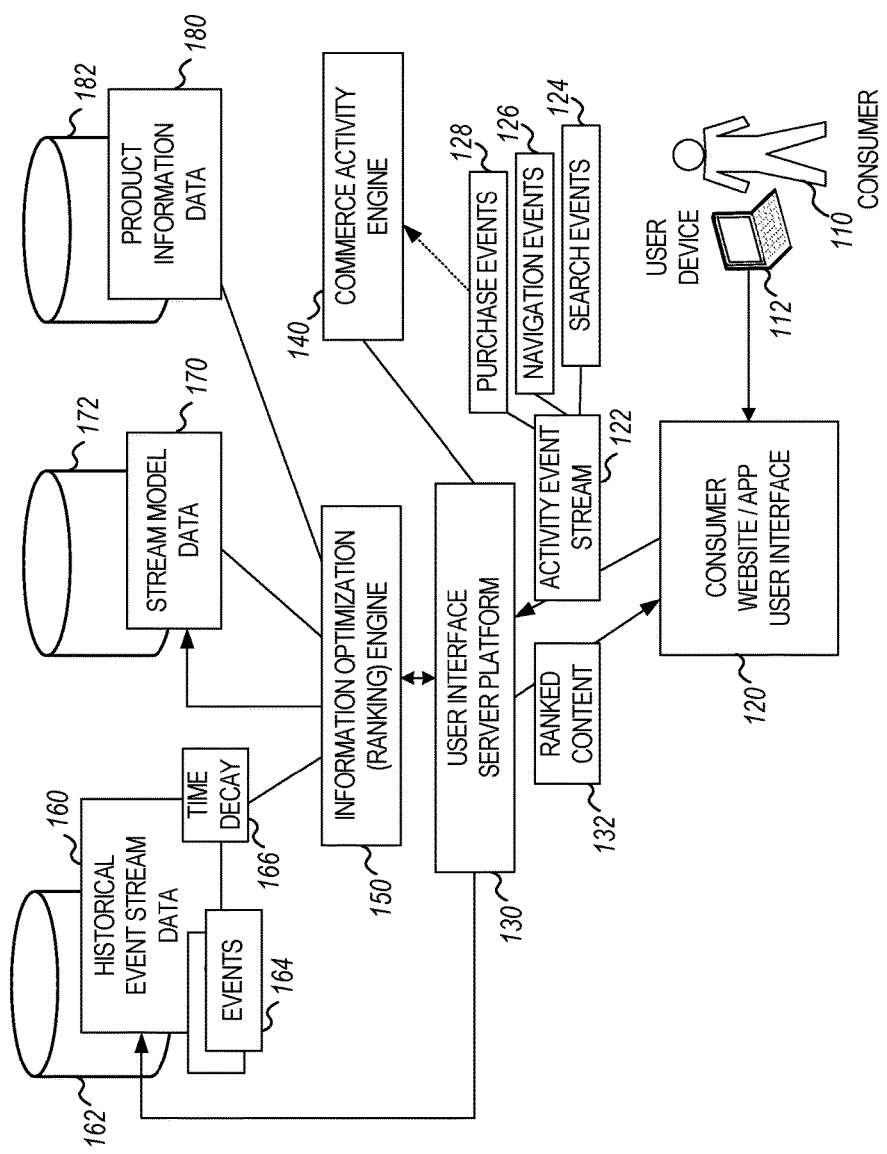
FIG. 1 illustrates an overview of systems involved in generation and use of a consumer user interface within an electronic commerce system, according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples discussed herein are directed to techniques and configurations of computing systems that provide user interfaces and data processing techniques of modeled user activities in various classes of information from streaming event data. As discussed herein, data modeling and information ranking may be deployed within a consumer-operated user interface platform, such as a website or software app, to improve the speed and functionality of the user interface platform and associated data processing and network communication transactions.

In an example, data modeling is used to process streaming events from a commerce-based user interface within the user interface platform, to generate a ranking model for data in the user interface platform. This ranking model is subsequently used to generate a ranking or ordering of information that is balanced among one or more engagement, exposure, and relevancy factors. As used herein, "engagement" generally refers to an amount, level, or type of activity received in a user interface (e.g., by a customer) to perform interactive actions with information (e.g., searching information items, navigating and browsing to particular items, performing actions such as selection or purchase of particular items, etc.); "exposure" generally refers to the amount, level, or type of output occurring in the user interface (e.g., a set of customers is "exposed" to an information item in a search result a certain number of times, or an advertisement is displayed for an information item at a certain frequency); and "relevancy" refers to an amount, level, or type of matching of characteristics relating to an information item (e.g., to match a search criteria, keyword, category, listing, or the like). Thus, references to an "engagement score", "exposure score", and "relevancy score" and related factors incorporate the respective characteristics of such engagement, exposure, and relevancy.

Although the discussed techniques focus on the ordering and selection of commerce information (e.g., product or service listings) within a commerce user interface, it will be understood that these information ranking and processing techniques may also be applicable to other types of user interfaces and architectures. These other interfaces may include architectures or information systems not directly involving a sale of a product or service, and like systems that do not directly involve the analysis of streaming events from electronic commerce websites or software apps.

The techniques discussed herein may be used to evaluate customer engagement and browsing behavior to provide custom rankings for e-commerce search results, product and service category listings, offers, and dynamic content. As a simple example, a ranking technique may be used to reorder the matching "relevant" search results from a keyword search; as a more complex example, the ranking technique may be used to generate dynamic search results and customize which information is displayed to a respective user and how the information is presented in user interfaces to the respective user. As further discussed, one aspect of this data processing technique includes obtaining information on customer engagement and customer behavior through the analysis of the "stream" of customer events occurring with an electronic commerce website or app, the use of operating models to analyze these events, and the evaluation of useful information such as information changes from customer engagement and exposure within inputs and outputs of the user interface.

Prior approaches for optimizing search results and customizing information in commerce user interfaces such as websites or apps often involved only basic analysis of historical activity. For example, historical customer data of whether a purchase occurs (e.g., whether "conversion" has occurred) is conventionally used to determine whether a particular product or service should be presented to a consumer, or to determine top ranking items in a consumer-entered search query or selected product category. However, customer conversion data is noisy and not precise, even as conversion data is often time-delayed and unpredictable. For instance, although conversion data may indicate that a consumer chose to purchase a particular product, it will not help explain why that particular product was chosen over another comparable product, why the consumer chose to purchase the product at a particular time, or whether other comparable products were even considered by the consumer. Thus, relying only on customer conversion data may cause an improper reinforcement cycle—popular products tend to stay popular because such products are purchased at a high rate, and popularly purchased products will be ranked higher and featured more prominently, driving more sales and popularity. As a result, many forms of manual (human-based) adjustment and custom rules are employed in existing systems to prevent distorted results or outcomes.

In contrast, the techniques discussed herein may be used to create a positive feedback loop based on customer activity (engagement) and outputs (exposure) within a commerce user interface. Such engagement scores may be variable based on the type of consumer activity, to clearly distinguish between varying levels of engagement (e.g., by increasing engagement scores based on involvement in a commerce workflow, obtaining a maximum value when a consumer makes a purchase). Further, the calculation of engagement and exposure scores may be based on actual consumer activity determined from streaming events—allowing a measurement of consumer activity even if a conversion (e.g., a sale of a product or service) does not occur.

Finally, the techniques discussed herein provide a mechanism for updating and optimizing various displays of information over time. In this fashion, the model may be used to produce a ranking that evaluates the characteristics of "relevant" information, while balancing exploration capabilities (to identify different or additional information results) and exploitation capabilities (to emphasize a popular or "winning" solution to increase usage of the relevant information). These and other technical benefits that increase information retrieval accuracy and improve delivery of information and data processing tasks will be apparent from these and other examples discussed herein.

FIG. 1 illustrates an overview of systems involved in generation and use of a consumer user interface within an electronic commerce system, according to an example described herein. As shown, a consumer 110 operates a consumer computing device 112 to access a consumer user interface 120. In an example, the consumer user interface 120 is a website or software application interface that is provided for facilitating electronic commerce. In the scenario of FIG. 1, the consumer 110 provides inputs to the user interface 120 to browse, navigate, and provide inputs while receiving and browsing information about products, services, and like aspects of electronic commerce offerings. An example arrangement of a consumer-facing e-commerce website is provided in FIG. 6 and further discussed below.

The user interface 120 may be provided (e.g., distributed, hosted, or exposed) via a network on behalf of a business entity such as a retailer. The consumer 110 also uses the user interface 120 to select and purchase a particular product or service, within one or multiple sessions of the user interface 120. The user interface 120 may present various forms of data, in the form of text, graphics, and video, relating to the purchase or specification of one or more products or services. The user interface 120 may obtain this data from various data systems and data sources, such as on request from a user interface server platform 130 that is maintained by the business entity or an associated service provider.

As shown in FIG. 1, the user interface 120 exchanges data with the user interface server platform 130, through various inputs and outputs exchanged between the interface and platform. For example, the server platform 130 may operate as a data service provided within a web server or cloud-hosted app interface (e.g., application programming interface (API)), which exchanges requests and responses between the interface and platform. In an example, the server platform 130 operates to serve (e.g., transmit or host) ranked content 132 to the user interface 120, based on an ordering or ranking of such content produced by a ranking engine 150. The server platform 130 additionally provides the ranked content 132 in response to an activity event stream 122 that indicates various activities occurring in the user interface 120. In an example, the activity event stream 122 may be based on a current session of the user interface 120 as operated by the consumer 110 on the consumer computing device 112. In a further example, the activity events 122 may be based on other (e.g., previous, historical) sessions of the user interface 120 as operated by the consumer 110.

In a further example, the activity events 122 may be based on other sessions of the user interface 120 as operated by other users (e.g., consumers), including historical data or modeled data. For instance, historical events 164 from among multiple users may be stored in connection with a historical event stream data set 160 (e.g., stored in a data source 162). As the user interface server platform 130 captures and tracks an activity event stream 122 from the user interface 120 provided among multiple users and user devices, the historical event stream data set 160 may be updated with additional historical events 164.

In an example, the ranking engine 150 is used to provide an ordering or prioritization of information obtained from a product information data set 180 (e.g., stored in a data source 182). The ordering or prioritization of this information may be customized according to one or more streaming models, provided from a stream model data set 170 (e.g., stored in a data source 172). The various stream models may provide various approaches for balancing of ranking information, and the ranking engine 150 may to update aspects (e.g., weights, factors, values) of the stream models as discussed with reference to the ranking methodologies within FIGS. 2 and 3 below. A further example of the results of a stream model, for retrieved product listings, is illustrated in FIG. 5 below.

In an example, the ranking engine 150 may evaluate aspects of the historical event stream data set 160 to determine engagement and exposure scores within the application of a stream model, as discussed with reference to the methodologies of scoring and modeling within FIGS. 4 and 5 discussed below. In a further example, time information such as a time decay setting 166 may be utilized to emphasize or de-empathize information and scores based on time values (e.g., such that older events are assigned a lower weight, or receive a lower score, thus allowing more recent events to take prominence within the ranking engine 150). Also, in a further example not depicted in FIG. 1, a time decay may be applied to events in the activity event stream 122. For example, new events may receive an exponentially higher weight based on an event time stamp. Other forms of time decay adjustment and weighting may be applied to other aspects of the stream model data 170, the product information data 180, or respective events of the search events 124, navigation events 126, purchase events 128, and the like.

The activity event stream 122 that is provided from the user interface 120 may include a variety of events initiated by the consumer 110, the consumer computing device 112, or other entities, such as search events 124 (e.g., from a user initiating a search to locate product or service information, based on one or more keywords or phrases); navigation events 126 (e.g., a user navigating between different pages or screens, such as by clicking on links, selecting another screen, etc.); and purchase events 128 (e.g., a user performing an affirmative shopping activity such as adding a product to a shopping cart, confirming payment information to purchase an item, scheduling a service or delivery, or like commerce activities). Some of these events, such as the purchase events 128, may result in the generation of additional commerce events (e.g., product reservations, purchases) performed or facilitated with a commerce activity engine 140.

In an example, multiple types of the events 124, 126, 128 may occur within a single user interface session. For instance, consider that multiple purchase events 128 involving a product, accessories, and services are likely to occur in connection with a user interface workflow involving a purchase of a particular product (e.g., a home appliance such as a washing machine). This workflow may involve a user first searching for a product (e.g., searching for the keywords "washing machine" in a search term box), receiving a user interface presenting listings of multiple matching product entries, receiving a user selection of one or more of those product entries, receiving a selection of one or more of those product entries to a shopping cart, and continuing on to the entry of purchase information, confirmation of shipping and payment information, etc. These events may contribute to different components of the engagement and exposure score applied by the ranking engine 150 and an event stream model.

As discussed herein, the ordered, ranked, or organized display of various forms of product information from the product information data set 180 may be based on the application of stream models from the stream model data set 170. These stream models in turn are generated or updated from streaming events (and associated engagement and exposure events) captured in the historical event stream data set 160. Accordingly, the output of the ranked content 132 may be directly based on the input and output events occurring in prior event streams. Further, the various activity event streams may be used to invoke or select a particular stream model, to generate a new stream model, or to update stream models. As a further example, a particular stream model provided by the stream model data set 170 and applied to the product information data set 180, may be based on a plurality of events 164, corresponding to the activity event stream 122 from sessions with the consumer 110 and many other users.

Figure 2:
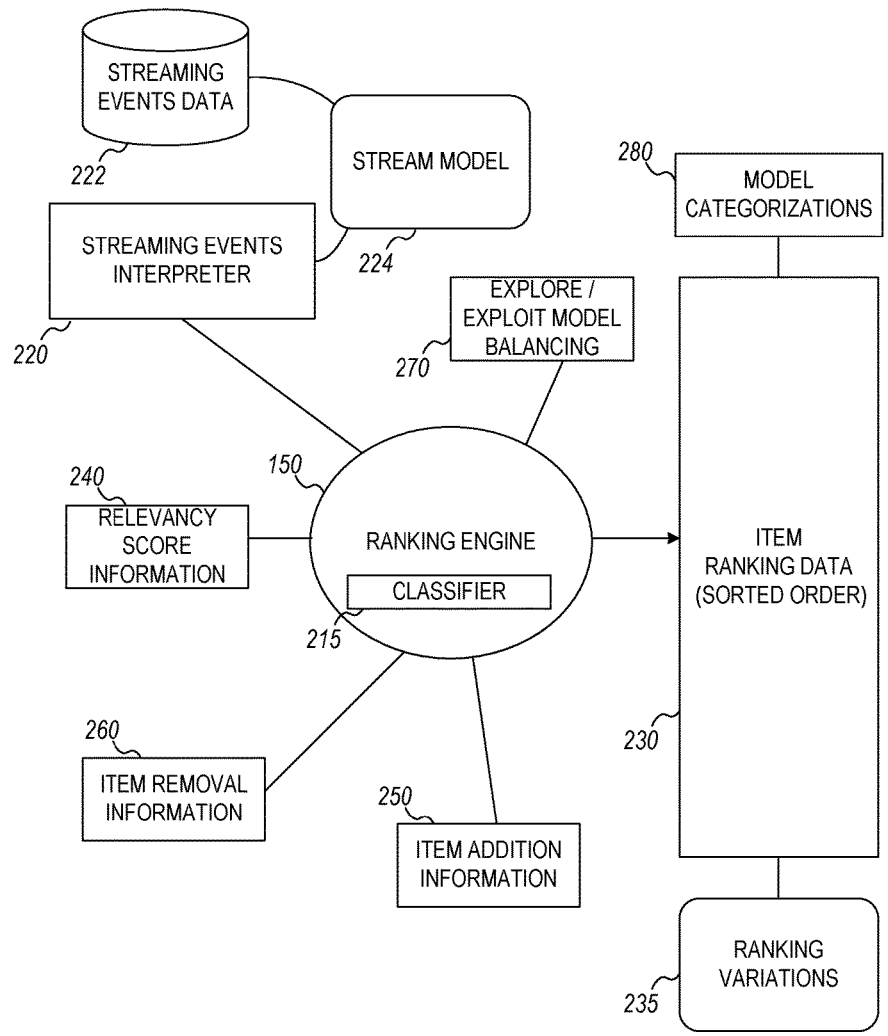
FIG. 2 illustrates an overview of an information ranking model customized to streaming event modeling and processing techniques, according to an example described herein.

FIG. 2 illustrates an overview of an information ranking model customized to streaming event modeling and processing techniques, according to an example described herein. As shown, the ranking engine 150 is adapted to generate an output of item ranking data 230 in a sorted order, through use of one or more applied classifiers 215. The ranking engine 150 selects and applies the classifier 215 based on streaming events evaluated with streaming events interpreter 220, and the use of information inputs 240, 250, 260, 270, as further discussed below.

In an example, the occurrence of multiple historical streaming events may be used by the classifier 215 produce an ordering of products in a multi-product listing; the occurrence of particular current streaming events (e.g., within an ongoing customer session) may be used by the classifier 215 to generate a further ordering of the products in the product listing; the information inputs 240, 250, 260, 270 may be used to emphasize or de-emphasize certain characteristics to change the ordering position within the product listing. Additionally, the item ranking data 230 produced with the classifier 215 may be further affected by pre-defined ranking variations 235 (e.g., defined rules), or the application of specific model categorizations 280 (e.g., item rankings that apply to a specific consumer, product type, etc.).

In an example, the streaming events interpreter 220 operates to process current or historical streaming events data 222 captured within a user interface (e.g., user interface 120, discussed above). The streaming events may be further processed via a stream model 224 (e.g., provided by the stream model data set 170), which may filter, restrict, anonymize, emphasize, or de-emphasize particular streaming events. In a further example discussed in FIG. 3, the streaming events data 222 may be refined and maintained within additional models and stored in a data lake.

In an example, streaming events captured from the user interface may include: searches to retrieve a particular product, product type, product brand, or product characteristics; navigation or selection of a product or service; selection or comparison navigation to view additional information, product specifications, reviews, features, or the like; selection or other commands to add a product to cart, or to reserve or schedule a service; and selection or other commands to finance, reserve, or perform a purchase activity.

These and like types of streaming events may be scored, to emphasize or de-emphasize certain types of events. In an example, initial events such as searches or navigation may receive a lower score; whereas more complex or sequential acts, such as the placement of a particular product into an electronic shopping cart, or a request to purchase the product, result in a higher score. Further discussion of event interpretation and application of scores is discussed below with reference to FIGS. 3 and 4.

The application of the classifier 215 within the ranking engine 150, to produce the item ranking data 230, may utilize the information inputs 240, 250, 260, 270, to adjust rankings, orderings, and matching operations. This may include relevancy score information 240, used to emphasize or de-emphasize ordering based on relevancy information (e.g., as implemented with a relevancy score discussed with FIG. 4, below); explore/exploit model balancing 270 (e.g., as implemented with balancing between an exposure score and an engagement score discussed with FIG. 4, below); item addition information 250 (e.g., to allow additional emphasis or selection of additional, new items, or changed items within the item ranking data 230); and item removal information 260 (e.g., to allow decreased emphasis or exclusion of particular items within the item ranking data 230). In still further examples, the model characterizations 280 may be used to select or apply different types of ranking models, based on user segmentation or other identified factors.

Figure 3:
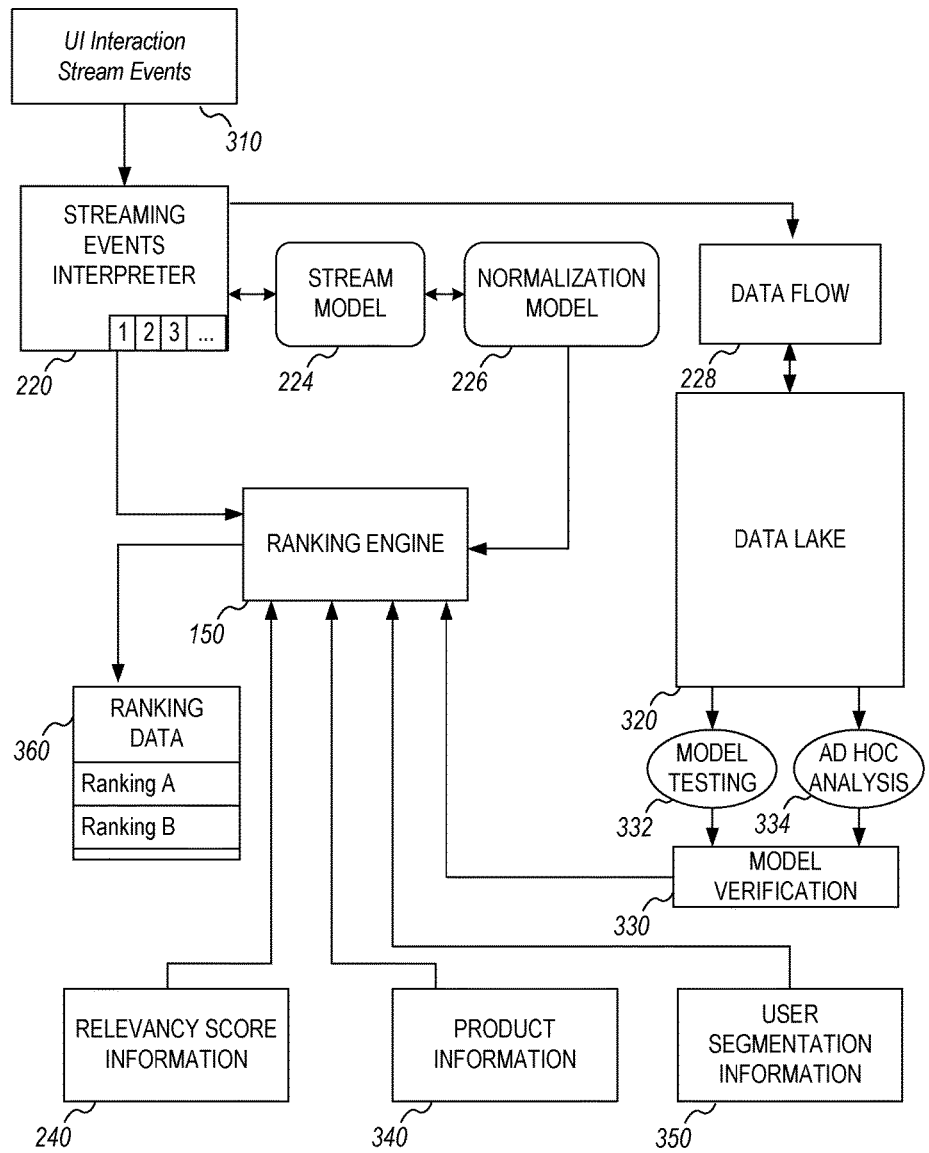
FIG. 3 illustrates an interconnection between information events and an information ranking model according to an example described herein.

FIG. 3 illustrates an interconnection between information events and an information ranking model according to an example described herein. Building on the examples discussed above, the ranking engine 150 may be used to produce rankings based on various aspects of relevancy score information 240, product information 340, and user segmentation information 350. This information is used to provide respective orderings of information within ranking data 360.

As shown, the various streaming events, received as part of user interface interaction stream events 310, including input and output events, are generated from one or more user interaction sessions conducted by respective users. The stream events 310 are provided to the streaming events interpreter 220 for filtering, processing, and identification of user inputs and interface outputs, and application within a stream model 224. The stream events 310 may be further processed within a normalization model 226 (e.g., to identify common types or characteristics of streaming events, for a normalized classification of such events), with the output of such processing provided to the ranking engine 150.

As also shown, a data flow model 228 may be used to identify or classify particular types of streaming events within a commerce workflow, for further storage analysis. In an example, the various stream events produced from the data flow model 228 may be maintained within a data lake 320 or other data event collection, provided among one or more data stores and systems. In an example, the data lake 320 provides a common location for the storage and retrieval of a sequence of historical (and in some examples, present) streaming events, allowing evaluation of complex user interactions and selection of certain streaming events, streaming event types, streaming event scenarios and flows, and the like. Thus, the data lake 320 provides a record of stream events that can provide a playback of relevant input and output events.

The ranking engine 150 is further depicted as receiving an input from a model verification 330, as the outputs of the ranking engine 150 implement various classifiers and models as tested, verified, and deployed within a user interface platform. In an example, the model verification 330 may be performed based on various implementations of model testing 332 and ad hoc analysis 334 on historical streaming events data maintained within the data lake 320. In an example, the model testing 332 may include the application of automated or manual test for ranking characteristics; also in an example, the ad hoc analysis may include automated or manual verifications of specific ranking outcomes. The model testing 332 may also verify specific stream models (e.g., provided within stream models 224), normalization models (e.g., provided within the applied normalization model 226), and outputs from the ranking engine 150.

The output of the ranking engine 150, as discussed above, may be based on relevancy score information 240, in addition to being based on product information 340 and user segmentation information 350, in the selection of a particular ranking or ranking outcome. As illustrated, the ranking engine 150 may produce multiple rankings that are selected for use with a particular consumer or with a particular user interface session. For instance, the relevancy score information 240 may be used to emphasize certain product features or characteristics (e.g., matching in a product category or search query).

Figure 4:
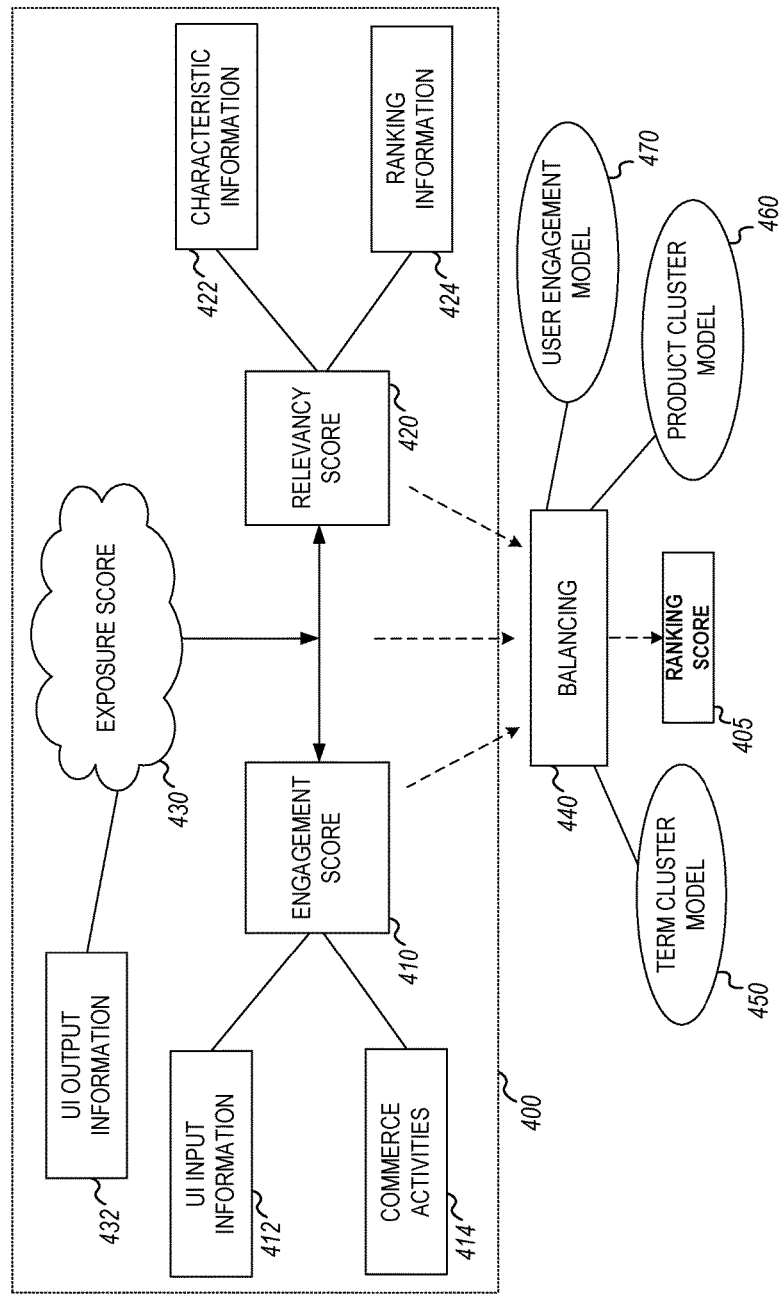
FIG. 4 illustrates a user information model involving a balancing of engagement, exposure, and relevancy, determined from information events, according to an example described herein.

FIG. 4 illustrates a user information model 400 involving a balancing of engagement, exposure, and relevancy, determined from information events, according to an example described herein. In an example, the user information model 400 operates within the ranking engine 150, such as in the previously described examples, to produce a ranking score 405 for respective information items. In other examples, the user information model 400 may be applied as scoring approach for applying other aspects of information control and modification within a user interface.

In an example, past exposure to streaming events are used to determine information characteristics. For instance, an engagement score 410 may be calculated based on previous (e.g., historical) user interface input information 412 and commerce activities 414 (e.g., produced from analysis of streaming events of inputs to a user interface within a workflow); an exposure score 430 may be calculated based on user interface output information 432 (e.g., produced from analysis of streaming events of outputs from a user interface); a relevancy score 420 may be calculated based on characteristic information 422 and ranking information 424.

In an example, the engagement score 410 may consider varying levels or weights of scores, based on the type and amount of engagement activity received from inputs from one or more users in a user interface. For instance, increasing score values of the engagement score may be assigned based on progressive activities in a commerce workflow (e.g., applying a minimum score value for a user clicking on a link to retrieve information for a product; applying a higher score value for the user clicking on a link to navigate reviews for a product; applying an even higher score value for the user adding to an electronic shopping cart, and applying and even higher score value for the user making an electronic purchase of the item, and the like). Other variations or uses of weights, including time decay values, may also be used for calculating the engagement score.

In a similar example, the exposure score 430 may consider varying levels or weights of scores, based on the type and amount of exposure activity provided in outputs to the one or more users in a user interface. For instance, increasing score values of the exposure score may be assigned based on a progressively increasing output visibility of a particular product or information listing (e.g., applying a minimum score value for an inclusion of a product in a search result; applying a higher score value for a targeted advertisement; applying a still higher score value for a prominently featured product; and the like). Other variations or uses of weights, including time decay values, may also be used for calculating the exposure score.

In an example, the user information model (and accompanying scores 410, 420, 430) may be analyzed according to a balancing procedure 440 (e.g., to perform balancing based on an explore and exploit objective, a particular confidence measurement or evaluation, or the like). This balancing 440 may allow evaluation and adjustment of various produced engagement/exposure/relevancy models, to prevent extreme or biased results from the ranking score 405. In an example, the balancing 440 of the ranking score 405 may be customized to one or more of a term cluster model 450, a product cluster model 460, or a user engagement model 470. In an example, the term cluster model may provide a confidence value of ranked search result based on the similarity of searched terms to clusters of terms, keywords, phrases, or the like. In an example, the product cluster model 460 may provide a confidence value of ranked product listings based on clusters of products and similarity between product types, product brands, product categories, or product characteristics. In an example, a user engagement model 470 may provide a confidence value based on typical user interactions, to prevent abnormal sessions or patterns of inputs or outputs from adversely affecting the ranking score 405.

FIG. 5 illustrates an example output of result sets from streaming event modeling and processing techniques, according to an example described herein. Specifically, FIG. 5 illustrates the results of three streaming models 510, 520, 530, generated respectively for a term search, a product category selection, and a product sub-category selection.

As shown, the first streaming model 510 includes a set of results provided from a term search of one or more keywords, phrases, or word strings. Specifically, as shown, the search for the phrase "large high efficiency washer" returns three results, which are ordered according to a combination of balanced combination of relevancy (e.g., using a relevancy score based on matching product characteristics), engagement (e.g., using an engagement score based on prior user engagement input activities), and exposure (e.g., using an exposure score based on prior user output presentations). For instance, the search for a "large" type of appliance may prioritize the top result (e.g., the "ACME 5 Cu. Ft." washer) having the largest appliance size. However, user engagement in prior sessions to browse, select, and purchase the other items may also be considered, such as used to prioritize the second result (e.g., the "WasherCo 4 Cu Ft." washer) over a third result (e.g., the "ACME 4.5 Cu Ft." washer). The user engagement and relevancy scores are respectively weighted using the exposure score. A time decay or confidence adjustment may be also applied with any of the scores to result in a change to the ordering.

As also shown, the second streaming model 520 includes a set of results provided from selection of a predefined product category. This product category encompasses a larger number of results than provided in the first streaming model 510. As shown, each of the results from the first streaming model 510 are encompassed in the second streaming model 520, but with a reordering variation. Specifically, products involving a larger amount of engagement (e.g., the "ACME Stackable 2.5 Cu. Ft." washer) relative to the amount of exposures are ranked higher; products with a lower amount of engagement with a high amount of exposure are ranked lower. The ranking within the second streaming model 520 also may be adjusted according to time decay, characteristic information, types of exposure and engagement, and other forms of model adjustments.

As also shown, the third streaming model 530 includes a set of results provided from selection of a predefined product sub-category, encompassing a subset of the results from the predefined product category. The third streaming model 530 includes the same results as the first streaming model 510, but has been adjusted to de-emphasize a product size characteristic used in the first streaming model 510. As a result, the third stream model 530 produces another ordered set of results (but with a common lowest-ranked product, the "ACME 4.5 Cu. Ft." washer).

Figure 6:
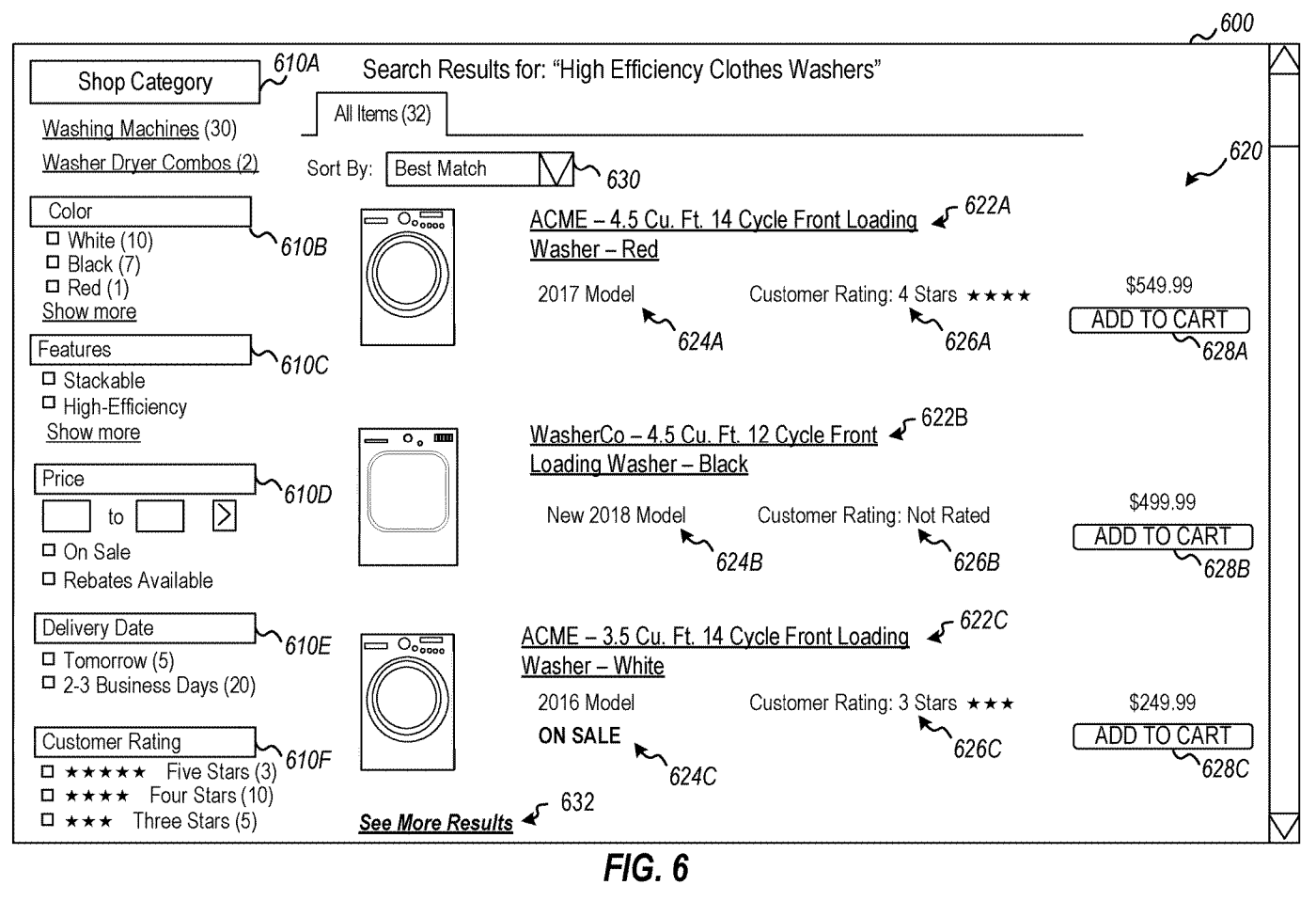

FIG. 6 illustrates functionality of a user interface layout 600 configured to provide an output in connection with streaming event modeling and processing, according to an example described herein. Specifically, the user interface layout 600 is adapted to present and receive information and selection options for products or services in a webpage-based user interface. As shown in FIG. 6, the user interface layout 600 provides an interface with a number of information selection and display options, specifically depicting search results 620 for a particular product type (a type of appliance matching a search term string). It will be understood that the example of the user interface layout 600 is not limited to the presentation of appliance products, as other types of products, product features, and accompanying services may also be presented or advertised.

The user interface layout 600 specifically depicts the listing of three products for selection and purchase, in addition to sub-category selectors 610A and search options (610B-610F) to refine, limit, or invoke a subset of results. As shown, a set of sub-categories selectors 610A may be automatically populated and displayed. The interactive search options include a series of user interface checkboxes that allow the inclusion or exclusion based on product characteristics (product color 610B and product features 610C), price for the product (610D), delivery date for the product (610E), and customer ratings provided for the product (610F). For instance, a consumer may choose to select one or more of the user interface checkboxes to expand or limit the search results 620. Further, the presented search results may be manually ordered with use of a selection option 630. In an example, the use of a pre-defined ordering or ranking (e.g., a "Best Match", "Most Relevant", etc.) may be employed; the ordering and ranking, and groupings for such rankings, may be invoked by a user.

The information that is presented in the search results 620 may include basic or detailed information, including text and graphical information in a variety of forms. As shown, information presented for a first product may include a corresponding product link 622A, product summary information 624A, customer rating 626A; the information presented for a second and third product may include a corresponding second and third product link 622B, 622C, product summary information 624B, 624C, and customer ratings 626B, 626C. Each of the search results may include a purchase selection option, such as respective "Add to Cart" buttons 628A, 628B, 628C for the first, second, and third products. Visibility of additional search results may be provided through an affirmative selection of additional results (e.g., a "See More Results link 632), through scrolling or swiping, or through other forms of user interaction.

As discussed with the techniques above, the output provided within the search result 620 may be used to affect a subsequent exposure score for a product ranking. For instance, the position of a product that is viewable within a search result listing and presented to a user may result in a positive value contributing to the exposure score, whereas a product that is not viewable within the search result may result in a zero or negative value decrementing the exposure score. Likewise, various types of commerce inputs with the search results 620 (e.g., clicking on a product link 622, selecting or interacting with the information 624, 626, or invoking a purchase option such as "Add to Cart" 628) may be used to affect a subsequent engagement score. It will be understood that the user interface layout 600 is one example of a user interface output, as many other user interface screens relating to products, services, categories, and groupings of such products or services, and the like may be provided within a user interface. Accordingly, the exposure score and engagement score may be based on streaming events received among any of these user interface screens.

Figure 7:
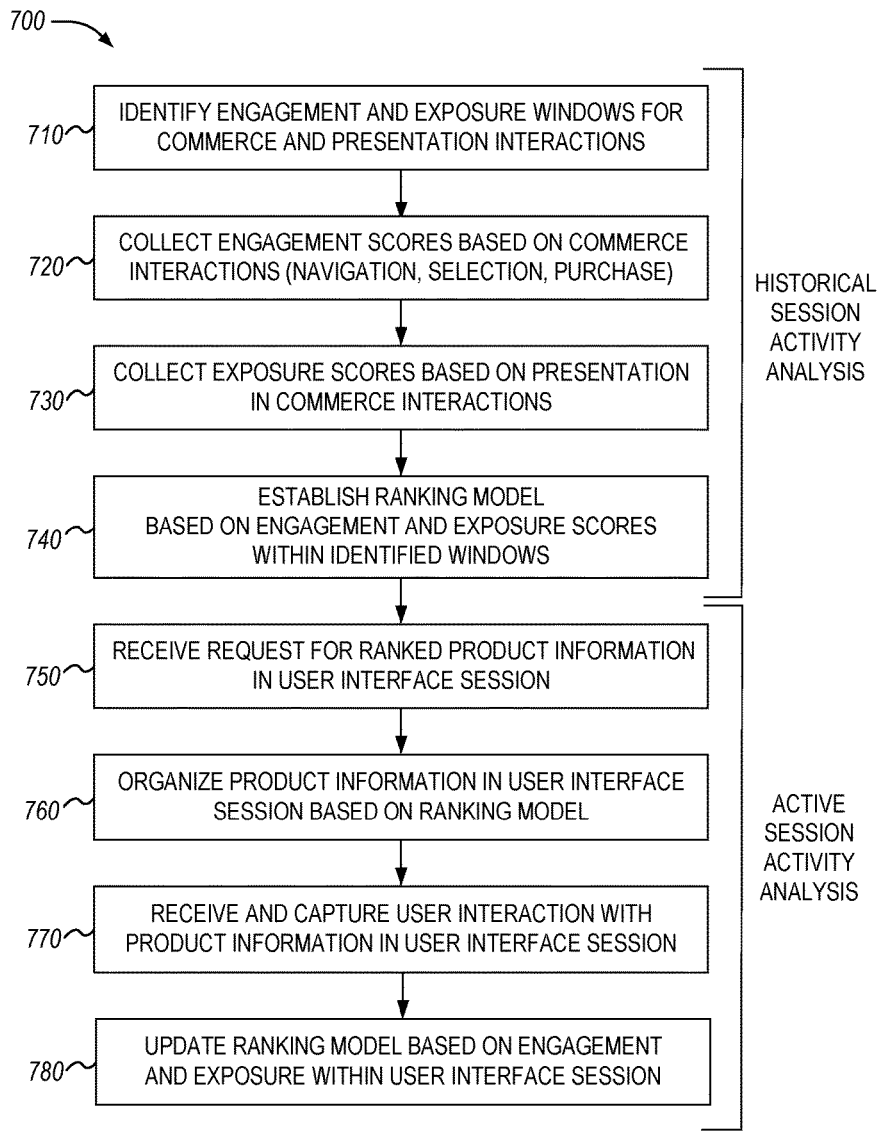
FIG. 7 illustrates a flowchart of a technique for capturing and processing information in historical and active user interface sessions, according to an example described herein.

FIG. 7 illustrates a flowchart 700 of an example technique for capturing and processing information in historical and active user interface sessions, for use with the information ranking techniques produced from streaming events as discussed herein. The flowchart is depicted from the perspective of a data processing system, such as a data processing system including by a web server or software interface that receives and coordinates operations with streaming event data store and a user interface processing system. However, it will be understood that the following techniques may be applicable among multiple types of systems, and within other types of user interaction settings.

The flowchart 700 specifically depicts a scenario for creating a ranking model based on historical session activity produced from user interface streaming events (operations 710-740), and utilizing the ranking model within an active session (operations 750-780). As shown, the operations of the flowchart 700 commence with the identification of engagement and exposure windows for commerce and presentation interactions (operation 710). In an example, these windows may be based on predefined rules or characteristics defined for streaming events, such as to identify streaming events associated with particular inputs and outputs. The streaming events of the user interface may be further processed to calculate engagement scores based on commerce interactions received in the user interface (operation 720), and to calculate exposure scores based on presentation outputs provided in the user interface (operation 730). For instance, the commerce interactions may be based on navigation, selection, or purchase activities occurring from input events monitored in a commerce workflow; the presentation outputs may correspond to information output events monitored in the commerce workflow.

Based on the engagement scores and the exposure scores, a ranking model may be established and tuned (operation 740). In an example, the ranking model is adjusted to analyze or emphasize data from particular time windows, or based on expected model outputs, to exclude exposure streaming events that include out-of-date or abnormal information. The ranking model may be stored or persisted for further use, such as in use with an active session.

The flowchart 700 continues with the utilization of the ranking model in an active session, which includes the analysis of additional streaming events received in a session with a particular consumer. This may include the receipt of a request for ranked product information in a user interface session (operation 750), and the organization of product information for output in the user interface session based on the ranking model (operation 760). The use of the model may include the ranking, ordering, and grouping techniques for product listings as discussed above in the examples of FIGS. 4 to 6.

The flowchart 700 concludes with the receipt and capture of user interaction information (inputs) in the user interface session, based on user interaction, commands, and the like relative to the output of product information. Such inputs are illustrated as being provided with streaming events in the user interface session (operation 770). Finally, the ranking model may be updated or adjusted (operation 780), based on engagement and exposure changes within the user interface session (resulting in engagement scores and exposure score changes).

Figure 8:
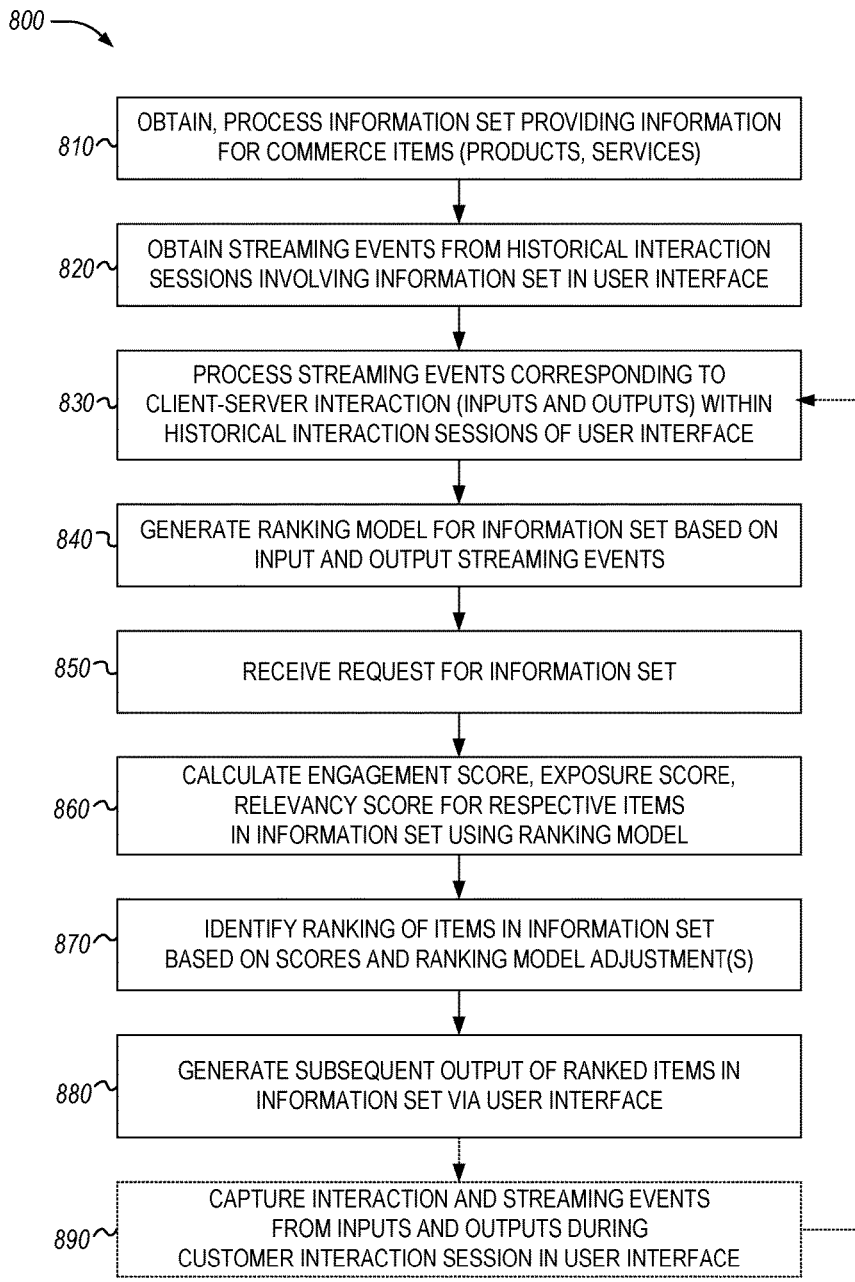
FIG. 8 illustrates a flowchart of an example method for generating a user interface that provides information based on streaming events modeling according to an example described herein.

FIG. 8 illustrates a flowchart 800 of an example method for generating a user interface that provides information based on streaming events modeling according to an example described herein. It will be understood that the operations of the flowchart 800 may be implemented in connection with a computer-implemented method, instructions on a computer readable medium, or on a configuration of a computing device (or among multiple of such methods, products, or computing devices). In an example, the electronic operations are performed by a computing system that operates as a server to host and generate features of a client-accessible user interface (e.g., from a web server); in another example, the electronic operations are performed within aspects of distributed or client computing devices used to present the user interface.

As shown, the operations of the flowchart may commence to include obtaining and processing an information set related to commerce items (operation 810), such as information related to commerce products or services. This information set may be designed to be exposed via a user interface, such as the consumer-accessible user interface formats discussed above.

The operations of the flowchart 800 continue with obtaining and streaming events, with the streaming events representing user interaction in a commerce user interface (operation 820). In an example, the streaming events indicate inputs received within the user interface and outputs provided within the user interface, with such inputs and outputs relating to multiple items of the information set.

The operations of the flowchart 800 continue with the processing of the streaming events, corresponding to various forms of client-server interaction such as inputs and outputs within a commerce user interface (operation 830). In an example, the commerce user interface is provided in a software application operating on respective client computing devices, with the software application providing a plurality of linked user interface screens, such that the streaming events are generated from navigation by respective users within the software application. In another example, the commerce user interface is provided in a website hosted by a server computing device, such that the streaming events are generated from navigation in a web browser conducted by a respective user with the website.

In an example, these streaming events are produced from a plurality of historical interaction sessions of one or multiple user interfaces. Based on the streaming events, operations are performed for generating a ranking model, and for use in a subsequent output of the information set within the commerce user interface (operation 840). In an example, the ranking model provides an ordering of the subsequent output using an exposure score and an engagement score. In a further example, the engagement score for a respective item of the information set is based on the inputs received within the user interface for the respective item, and the exposure score for the respective item of the information set is calculated based on the outputs provided from the user interface for the respective item.

The operations of flowchart 800 continue with the receipt and processing of a request for the information set (operation 850), such as in a request received within the commerce user interface (by the same or another user, in the same or another session). This request is used to produce a ranking of items, which is generated based on the calculation of an engagement score, exposure score, and relevancy score for respective items in the information set (operation 850). In a further example, the request in the user interface includes one or more of: a search query, a category selection, or a type selection for the items of the information set.

The ranking engine performs the calculation of the engagement score, exposure score, and relevancy score based on inputs and outputs, determined from historical or active streaming events within the commerce user interface (operation 860). In an example, the engagement score is based on inputs received from a plurality of users in the user interface, such that the engagement score of a respective information item relates to respective commerce activities performed with the respective information item by the plurality of users in a commerce workflow. In a further example, the engagement score is produced from a plurality of scored activities in the commerce workflow, such that the respective commerce activities include selection and purchase of a commerce item corresponding to the respective information item. Also in an example, the exposure score is based on outputs to a plurality of users in the user interface, such that the exposure score of a respective information item relates to outputs performed with the respective information item by the plurality of users in the commerce workflow.

Using the identified scores, a ranking of the items in the information may be produced based on the scores and any ranking model adjustments (operation 870). In an example, the respective items of the information set are ordered among each other within the commerce user interface based on the engagement score and the exposure score. In a further example, ordering of the subsequent output is also based on a relevancy score, with the relevancy score based on matching characteristics of the request to the respective items of the information set. Also in a further example, the exposure score is used as a weight to the engagement score, relative to the relevancy score. Also in a further example, the relevancy score is based on one or more of: a keyword, a term, or an engagement pattern associated with the items of the information set matching the request.

The identified scoring and ranking is used to generate a subsequent output of ranked items in the information set, via the commerce user interface (operation 880). The operations of the flowchart conclude with optional operations to capture additional interaction and streaming events from inputs and outputs during the customer interaction of the commerce user interface (operation 890). In a further example, the particular ranking model that is selected, utilized, or updated may be selected from among a plurality of ranking models. For instance, respective models of the plurality of ranking models may be customized to varying weights of the exposure score and the engagement score of respective information items in the information set, and respective models of the plurality of ranking models may correspond to respective segmentations of customers in a commerce workflow The example operations of flowchart 800 may be performed at or among concerted functions of a client or server computing device. In an example, the software application is adapted to execute on the server computing device with use of a processor and a memory device. In another example, the presentation functions of the software application are adapted to execute in an app or browser of a client computing device, such as through a communication session provided via a web server or a software application interface. The example operations of flowchart 800 may be performed through a system comprising a ranking engine and an electronic user interface system, which is configured to provide or organize ranked data on behalf of an electronic commerce processing system. Other combinations and subsystems may be implemented with the operations of flowchart 800, such as illustrated with the following components in FIG. 9.

Figure 9:
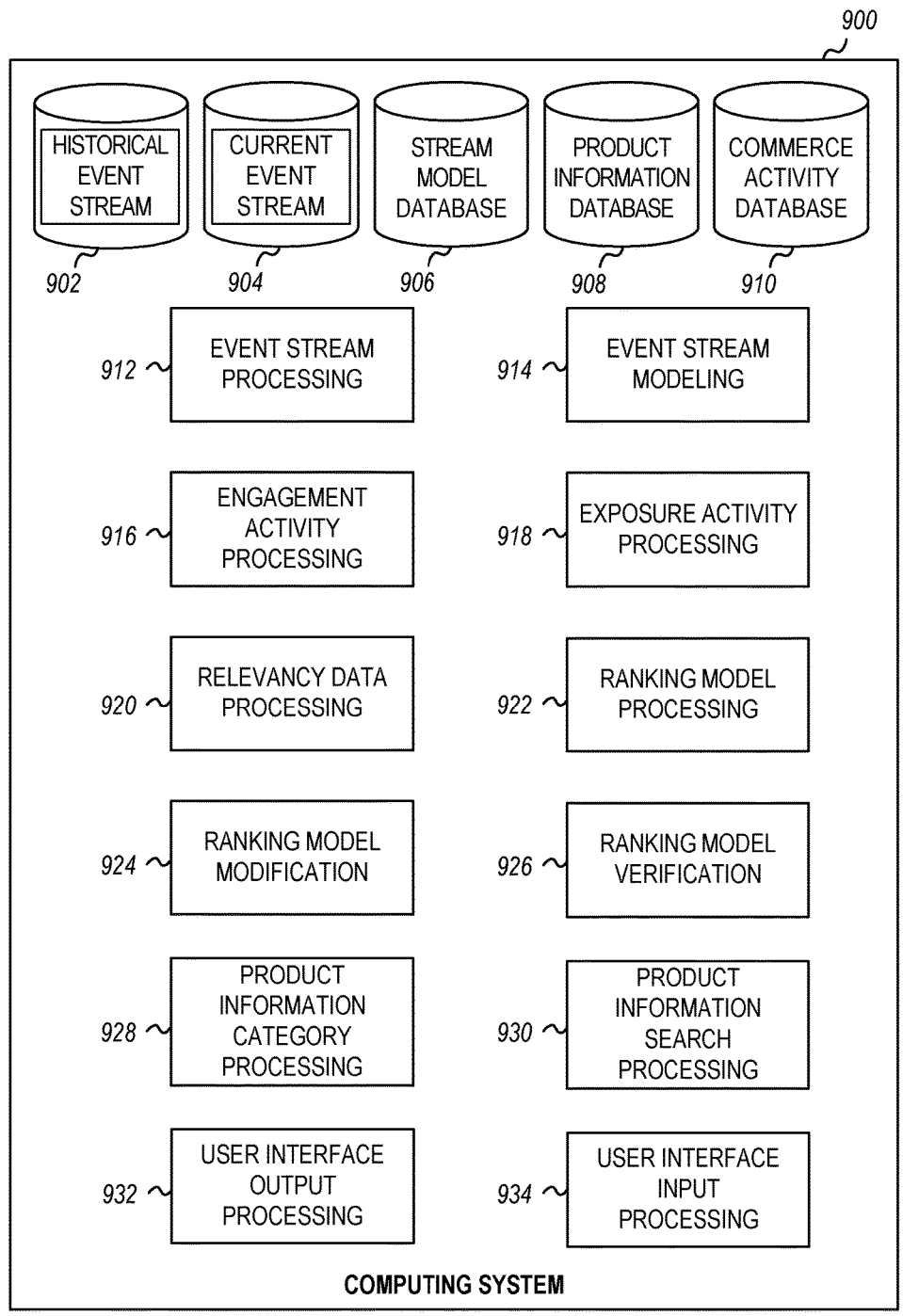
FIG. 9 illustrates a block diagram of processing and functionality components operable in a computing system implementing streaming event modeling and processing, according to an example described herein.

FIG. 9 illustrates a block diagram of processing and functionality components operable in a computing system 900 implementing streaming event modeling and processing, such as are accomplished with the examples described above. It will be understood, that although certain hardware and functional components are depicted in FIG. 9 and in other drawings as separate subsystems or services, the features of the subsystems or services may be integrated into a single system or service (e.g., in an application programming interface hosted by a server computing system). Further, although only one computing system is depicted, it will be understood that the features of these systems may be distributed among one or multiple computing systems (including in cloud-based processing settings).

As shown, the computing system 900 includes various functionality subsystems 912-934 used to perform event stream processing and modeling for user interface events and databases 902-910 to store information for the event stream information and to facilitate processing and modeling of event stream data in connection with the techniques discussed herein (e.g., discussed above for FIGS. 1-8). In an example, the computing system 900 is adapted to execute software applications that implement the functionality subsystems and databases, through software application processing components and functionality, such as circuitry and software instructions.

In an example, the computing system 900 includes data stores provided by a historical event stream 902, a current event stream 904, a stream model database 906, a product information database 908, and a commerce activity database 910. These databases may store and implement data for the various information items, models, and attributes as discussed in the examples above.

In an example, the computing system 900 is adapted to implement respective features including: event stream processing or functionality 912 (e.g., circuitry or software instructions) used to capture, obtain, and extract data from respective user interface streaming events from within a user interface; event stream modeling 914 (e.g., circuitry or software instructions) used to create and update event stream models applied to analyze user interaction streaming events; engagement activity processing or functionality 916 (e.g., circuitry or software instructions) used to identify and evaluate engagement activity from user interaction streaming events; exposure activity processing 918 (e.g., circuitry or software instructions) used to identify and evaluate exposure of information from user interaction streaming events; relevancy data processing or functionality 920 (e.g., circuitry or software instructions) used to identify and evaluate relevancy of information to be provided within the user interface; ranking model processing or functionality 922 (e.g., circuitry or software instructions) used to generate models for ranking, ordering, and grouping information within the user interface; ranking model modification processing or functionality 924 (e.g., circuitry or software instructions) used to update models for ranking, ordering, and grouping information within the user interface; ranking model verification processing or functionality 926 (e.g., circuitry or software instructions) used to verify and adjust models for ranking, ordering, and grouping information within the user interface; product information category processing or functionality 928 (e.g., circuitry or software instructions) used to analyze and utilize product information of inputs and outputs within the user interface; product information search processing or functionality 930 (e.g., circuitry or software instructions) used to facilitate a search of the information within the user interface; user interface output processing or functionality 932 (e.g., circuitry or software instructions) used to provide and analyze output characteristics of the information within the user interface; and user interface input processing or functionality 934 (e.g., circuitry or software instructions) used to provide and analyze input characteristics of the user interaction within the user interface. Other functional and processing aspects may be performed or structurally embodied by the computing system 900 to implement the techniques discussed above for FIGS. 1-8.)

Embodiments used to facilitate and perform the techniques described herein may be implemented in one or a combination of hardware, firmware, or software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
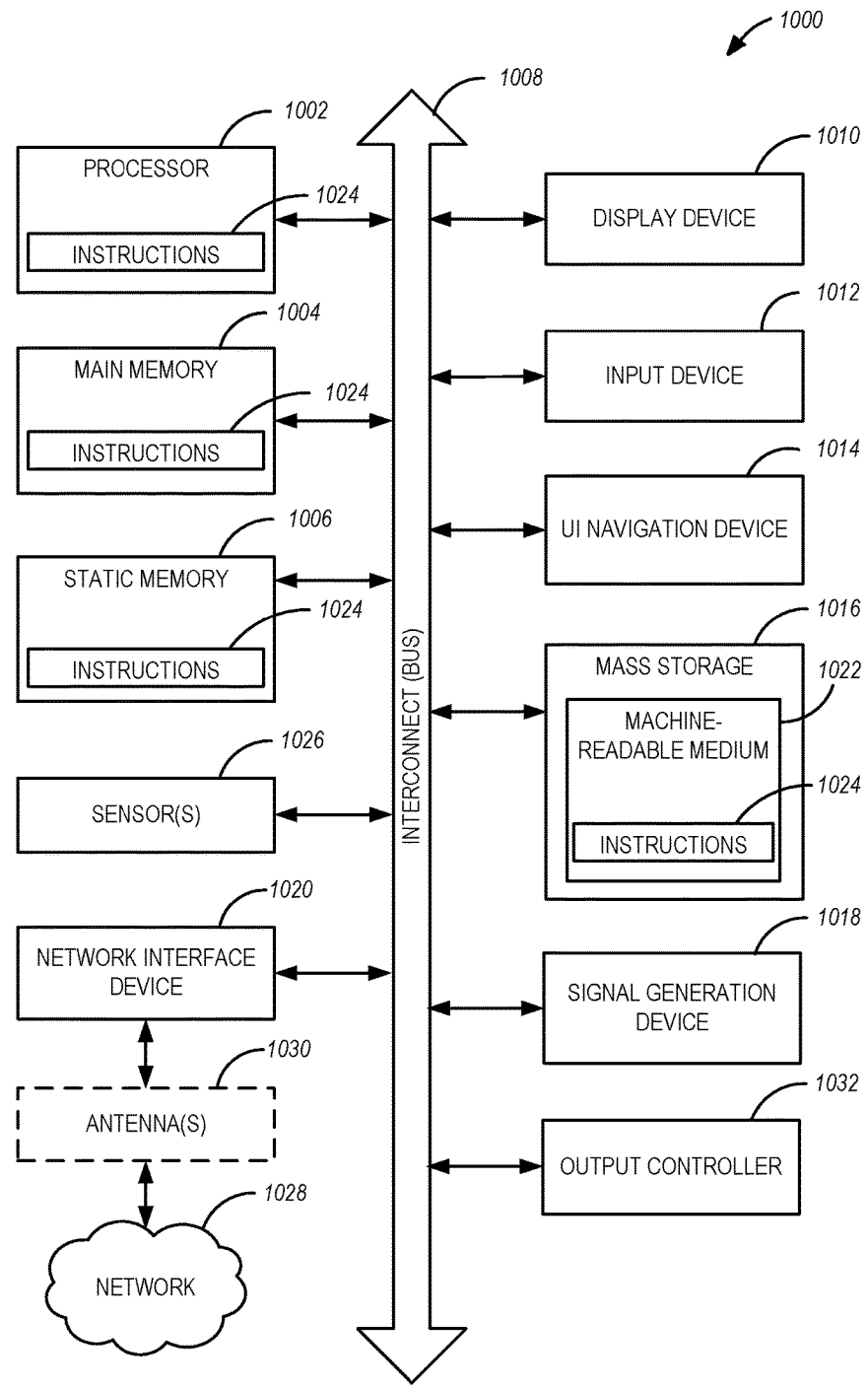
FIG. 10 illustrates a block diagram of operational components of a computing system upon which any one or more of the techniques herein discussed may be executed and implemented.

FIG. 10 illustrates a block diagram illustrating a machine in the example form of a computer system 1000, within which a set or sequence of instructions may be executed to cause the machine to perform any one of the methodologies discussed herein, according to an example Computer system machine 1000 may be embodied by the computing system 900; the subsystem(s) implementing the data stores 902-910; the subsystem(s) implementing the various processing or functionality 912-934; the systems and engines 130, 140, 150, and interface 120; the consumer computing device 112; or any other electronic processing or computing platform described or referred to herein. Further, the computer system machine 1000 may embody instructions and data to perform any of the interfaces or functions referenced for FIGS. 1-9.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system 1000 may further include a video display unit 1010, an alphanumeric input device 1012 (e.g., a keyboard), and a user interface (UI) navigation device 1014 (e.g., a mouse). In one example, the video display unit 1010, input device 1012 and UI navigation device 1014 are incorporated into a touchscreen interface and touchscreen display. The computer system 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A computer system comprising:
 a processor; and
 memory coupled to the processor and storing instructions that, when executed by the processor, cause the computer system to perform operations comprising:
 processing streaming events representing user interaction captured in communication sessions with one or more users of a commerce user interface, wherein the streaming events indicate inputs received from the one or more users within the user interface and outputs provided within the user interface for multiple items of an information set, wherein the streaming events are produced from information retrieval activities or interaction activities initiated from the one or more users in the commerce user interface, and wherein the information retrieval activities or interaction activities occur in the commerce user interface with a user interface display of the information set which involves one or more products or services;

producing a ranking model for a subsequent output of the information set within the commerce user interface, the ranking model providing an ordering of the subsequent output using an exposure score and an engagement score, wherein the engagement score for a respective item of the information set is based on the inputs received from the one or more users within the user interface for the respective item, and wherein the exposure score for the respective item of the information set is based on the outputs provided from the user interface for the respective item; and generating the subsequent output of the information set via the commerce user interface, using the ranking model, wherein the respective items of the information set are ordered among each other within the commerce user interface based on the engagement score and the exposure score.

2. The computer system of claim 1, the operations further comprising:

receiving a request in the user interface for the information set, wherein the subsequent output of the information set is provided via the user interface in response to the request;

wherein the ordering of the subsequent output is further based on a relevancy score, with the relevancy score based on matching characteristics of the request to the respective items of the information set; and wherein the exposure score is used as a weight to the engagement score, relative to the relevancy score.

3. The computer system of claim 2, wherein the request in the user interface includes one or more of: a search query, a category selection, or a type selection for the items of the information set, and wherein the relevancy score is based on one or more of: a keyword, a term, or an engagement pattern associated with the items of the information set matching the request.

4. The computer system of claim 1, wherein the engagement score is based on inputs received from a plurality of users in the user interface, wherein the engagement score of a respective information item relates to respective commerce activities performed with the respective information item by the plurality of users in a commerce workflow.

5. The computer system of claim 4, wherein the engagement score is produced from a plurality of scored activities in the commerce workflow, wherein the respective commerce activities include selection and purchase of a commerce item corresponding to the respective information item, and wherein the plurality of scored activities are determined from the streaming events.

6. The computer system of claim 1, wherein the exposure score is based on outputs to a plurality of users in the user interface, wherein the exposure score of a respective information item relates to outputs performed with the respective information item by the plurality of users in a commerce workflow, and wherein the plurality of scored activities are determined from the streaming events.

7. The computer system of claim 1, the operations further comprising:

selecting the ranking model from among the plurality of ranking models, wherein the ranking model is produced as part of producing a plurality of ranking models;

wherein respective models of the plurality of ranking models are customized to varying weights of the exposure score and the engagement score of respective information items in the information set; and wherein the respective models of the plurality of ranking models correspond to respective segmentations of customers in a commerce workflow.

8. The computer system of claim 1, the operations further comprising:

interpreting the streaming events to identify engagement activities from the inputs received in the user interface and exposure activities from outputs provided in the user interface;

wherein the streaming events are received in the user interface over a plurality of customer sessions; and wherein the streaming events are filtered based on relevancy of the engagement activities and the exposure activities to the respective item.

9. The computer system of claim 8, the operations further comprising:

applying time decay weights to the streaming events, wherein a respective time decay weight of a respective streaming event is applied based on a time stamp of the respective streaming event, and wherein interpreting the streaming events includes using the time decay weights.

10. The computer system of claim 1, wherein the user interface is provided in a software application operating on respective client computing devices, wherein the software application provides a plurality of linked user interface screens, and wherein the streaming events are generated from navigation by respective users within the software application.

11. The computer system of claim 1, wherein the user interface is provided in a website hosted by a server computing device, and wherein the streaming events are generated from navigation in a web browser conducted by a respective user with the website.

12. A method, comprising a plurality of electronic operations executed with processor circuitry of a computing device, the plurality of electronic operations including:

processing streaming events representing user interaction captured in communication sessions with one or more users of a commerce user interface, wherein the streaming events indicate inputs received from the one or more users within the user interface and outputs provided within the user interface for multiple items of an information set, wherein the streaming events are produced from information retrieval activities or interaction activities initiated from the one or more users in the commerce user interface, and wherein the information retrieval activities or interaction activities occur in the commerce user interface with a user interface display of the information set which involves one or more products or services;

producing a ranking model for a subsequent output of the information set within the commerce user interface, the ranking model providing an ordering of the subsequent output using an exposure score and an engagement score, wherein the engagement score for a respective item of the information set is based on the inputs received from the one or more users within the user interface for the respective item, and wherein the exposure score for the respective item of the information set is based on the outputs provided from the user interface for the respective item; and generating the subsequent output of the information set via the commerce user interface, using the ranking model, wherein the respective items of the information set are ordered among each other within the commerce user interface based on the engagement score and the exposure score.

13. The method of claim 12, the plurality of electronic operations further including:

receiving a request in the user interface for the information set, wherein the subsequent output of the information set is provided via the user interface in response to the request;

wherein the ordering of the subsequent output is further based on a relevancy score, with the relevancy score based on matching characteristics of the request to the respective items of the information set; and wherein the exposure score is used as a weight to the engagement score, relative to the relevancy score.

14. The method of claim 13, wherein the request in the user interface includes one or more of: a search query, a category selection, or a type selection for the items of the information set, and wherein the relevancy score is based on one or more of: a keyword, a term, or an engagement pattern associated with the items of the information set matching the request.

15. The method of claim 12, wherein the engagement score is based on inputs received from a plurality of users in the user interface, wherein the engagement score of a respective information item relates to respective commerce activities performed with the respective information item by the plurality of users in a commerce workflow.

16. The method of claim 12, wherein the exposure score is based on outputs to a plurality of users in the user interface, wherein the exposure score of a respective information item relates to outputs performed with the respective information item by the plurality of users in a commerce workflow.

17. The method of claim 12, the plurality of electronic operations further including:

selecting the ranking model from among the plurality of ranking models, wherein the ranking model is produced as part of producing a plurality of ranking models;

wherein respective models of the plurality of ranking models are customized to varying weights of the exposure score and the engagement score of respective information items in the information set; and wherein the respective models of the plurality of ranking models correspond to respective segmentations of customers in a commerce workflow.

18. The method of claim 12, the plurality of electronic operations further including:

interpreting the streaming events to identify engagement activities from the inputs received in the user interface and exposure activities from outputs provided in the user interface;

wherein the streaming events are received in the user interface over a plurality of customer sessions;

wherein the streaming events are filtered based on relevancy of the engagement activities and the exposure activities to the respective item; and wherein the streaming events are weighted based on time decay weights applied to the streaming events, wherein the time decay weights apply exponentially higher weights to newer streaming events of the streaming events.

19. The method of claim 12, wherein the user interface is provided in a software application operating on respective client computing devices, wherein the software application provides a plurality of linked user interface screens, and wherein the streaming events are generated from navigation by respective users within the software application.

20. The method of claim 12, wherein the user interface is provided in a website hosted by a server computing device, and wherein the streaming events are generated from navigation in a web browser conducted by a respective user with the website.

21. A non-transitory computer-readable storage medium, the computer-readable storage medium including instructions that, when executed by processor circuitry of a computing device, causes the processor circuitry to perform operations comprising:

processing streaming events representing user interaction captured in communication sessions with one or more users of a commerce user interface, wherein the streaming events indicate inputs received within the user interface and outputs provided within the user interface for multiple items of an information set, wherein the streaming events are produced from information retrieval activities or interaction activities initiated from the one or more users in the commerce user interface, and wherein the information retrieval activities or interaction activities occur in the commerce user interface with a user interface display of the information set which involves one or more products or services;

producing a ranking model for a subsequent output of the information set within the commerce user interface, the ranking model providing an ordering of the subsequent output using an exposure score and an engagement score, wherein the engagement score for a respective item of the information set is based on the inputs received from the one or more users within the user interface for the respective item, and wherein the exposure score for the respective item of the information set is based on the outputs provided from the user interface for the respective item; and generating the subsequent output of the information set via the commerce user interface, using the ranking model, wherein the respective items of the information set are ordered among each other within the commerce user interface based on the engagement score and the exposure score.

22. The computer-readable storage medium of claim 21, the operations further comprising:

receiving a request in the user interface for the information set, wherein the subsequent output of the information set is provided via the user interface in response to the request;

wherein the ordering of the subsequent output is further based on a relevancy score, with the relevancy score based on matching characteristics of the request to the respective items of the information set;

wherein the exposure score is used as a weight to the engagement score, relative to the relevancy score; and wherein the relevancy score is based on one or more of: a keyword, a term, or an engagement pattern associated with the items of the information set matching the request.

23. The computer-readable storage medium of claim 21, wherein the engagement score is based on inputs received from a plurality of users in the user interface, wherein the engagement score of a respective information item relates to respective commerce activities performed with the respective information item by the plurality of users in a commerce workflow.

24. The computer-readable storage medium of claim 22, wherein the exposure score is based on outputs to a plurality of users in the user interface, and wherein the exposure score of a respective information item relates to outputs performed with the respective information item by the plurality of users in a commerce workflow.

25. The computer-readable storage medium of claim 23, the operations further comprising:
- interpreting the streaming events to identify engagement activities from the inputs received in the user interface and exposure activities from outputs provided in the user interface;
- wherein the streaming events are received in the user interface over a plurality of customer sessions;
- wherein the streaming events are filtered based on relevancy of the engagement activities and the exposure activities to the respective item; and
- wherein the streaming events are weighted based on time decay weights applied to the streaming events, wherein the time decay weights apply higher weights to newer streaming events of the streaming events.

* * * * *